(12) United States Patent
Postage

(10) Patent No.: US 9,600,027 B2
(45) Date of Patent: Mar. 21, 2017

(54) MULTIPLE DISPLAY MOUNTING USING A SINGLE BASE

(71) Applicant: Lenovo (Singapore) Pte. Ltd., Singapore (SG)

(72) Inventor: Robert Brian Postage, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 13 days.

(21) Appl. No.: 14/262,048

(22) Filed: Apr. 25, 2014

(65) Prior Publication Data
US 2015/0309537 A1 Oct. 29, 2015

(51) Int. Cl.
*G09G 5/00* (2006.01)
*G06F 1/16* (2006.01)
*G06F 3/14* (2006.01)

(52) U.S. Cl.
CPC .......... *G06F 1/1607* (2013.01); *G06F 3/1423* (2013.01); *G09G 5/003* (2013.01); *G06F 3/1446* (2013.01); *G09G 2300/026* (2013.01); *G09G 2356/00* (2013.01)

(58) Field of Classification Search
None
See application file for complete search history.

(56) References Cited

U.S. PATENT DOCUMENTS

| | | | | |
|---|---|---|---|---|
| 3,428,108 A | * | 2/1969 | Singer | E04B 2/7431 160/135 |
| 5,137,462 A | * | 8/1992 | Casey | H01R 31/00 439/160 |
| 6,297,811 B1 | * | 10/2001 | Kent | G06F 3/044 178/18.01 |
| 6,543,164 B1 | * | 4/2003 | Sperl | G09F 15/0068 40/605 |
| 6,745,507 B2 | * | 6/2004 | Golding | G09F 13/04 362/812 |
| 7,612,821 B1 | * | 11/2009 | Hsia | H04N 5/23293 348/333.01 |
| 2004/0136150 A1 | * | 7/2004 | Ho | G06F 1/1607 361/679.04 |
| 2005/0096082 A1 | * | 5/2005 | Chang | G06F 1/1616 455/550.1 |
| 2005/0146845 A1 | * | 7/2005 | Moscovitch | B60R 11/02 361/679.27 |
| 2005/0178034 A1 | * | 8/2005 | Schubert | G09F 9/33 40/605 |
| 2008/0141571 A1 | * | 6/2008 | Kottwitz | G09F 9/33 40/605 |
| 2010/0124006 A1 | * | 5/2010 | Chang | G06F 1/1616 361/679.04 |
| 2013/0181884 A1 | * | 7/2013 | Perkins | H04N 9/3147 345/1.3 |

(Continued)

*Primary Examiner* — Kent Chang
*Assistant Examiner* — Nathan Brittingham
(74) *Attorney, Agent, or Firm* — Ference & Associates LLC

(57) ABSTRACT

An embodiment provides a device, including: a primary display unit; and at least one mounting mechanism operatively coupled to at least one side of said primary display unit that allows the mounting of at least one additional display unit; the mounting mechanism including electrical connections that facilitate detection of said additional display unit. Other aspects are described and claimed.

20 Claims, 3 Drawing Sheets

(56) References Cited

U.S. PATENT DOCUMENTS

| | | | | |
|---|---|---|---|---|
| 2014/0131069 A1* | 5/2014 | Chang | ...................... | H05K 3/40 |
| | | | | 174/251 |
| 2014/0218266 A1* | 8/2014 | Chen | ..................... | G06F 3/1446 |
| | | | | 345/1.3 |
| 2015/0342343 A1* | 12/2015 | Wang | ..................... | F16M 11/22 |
| | | | | 211/26 |

* cited by examiner

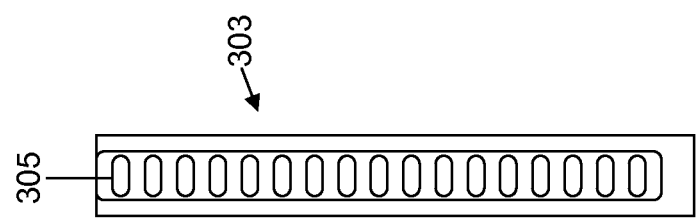
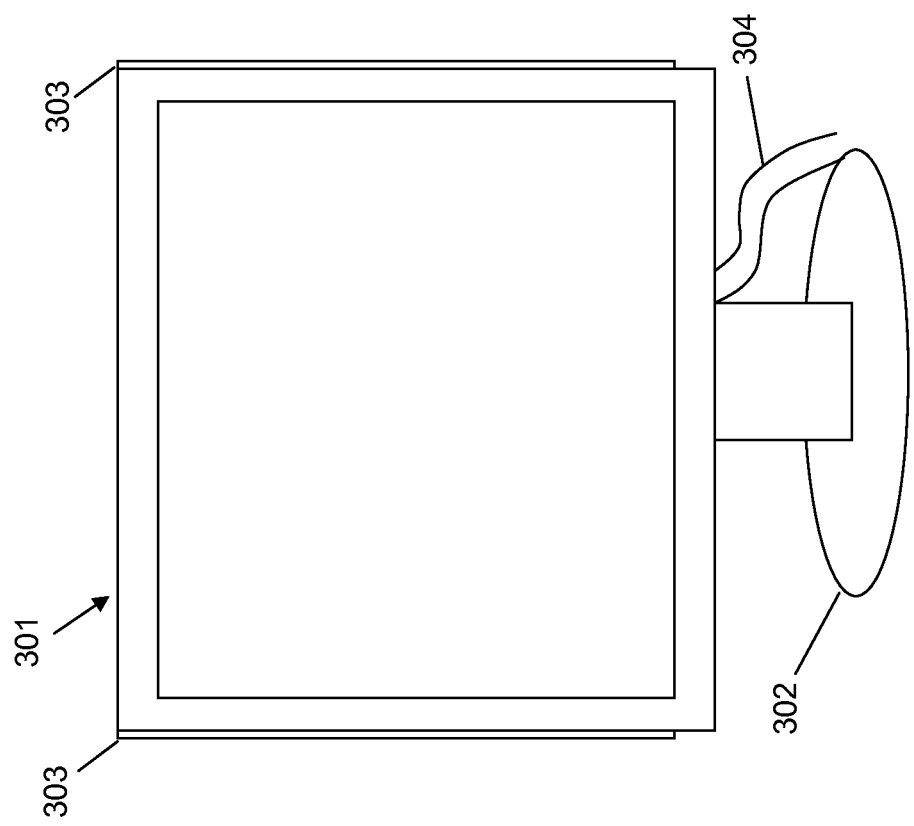
FIG. 3B
FIG. 3A

MULTIPLE DISPLAY MOUNTING USING A SINGLE BASE

BACKGROUND

Many people work better and more efficiently when they have multiple display units (i.e. computer monitors). There are different ways in which multiple display units may be implemented in a work space.

Commonly, people have separate displays cabled from the primary display to a secondary display, or, in the case of more than two displays, an intermediate dongle or other cabling solution. Alternatively, the user may have a large multi-screen display.

BRIEF SUMMARY

In summary, one aspect provides a device, comprising: a primary display unit; and at least one mounting mechanism operatively coupled to at least one side of said primary display unit that allows the mounting of at least one additional display unit; the mounting mechanism including electrical connections that facilitate detection of said additional display unit.

Another aspect provides a system, comprising: a computing device; a primary display unit operatively connected to the computing device, the primary display unit comprising: at least one mounting mechanism operatively coupled to at least one side of said primary display unit that allows the mounting of at least one additional display unit; the mounting mechanism including electrical connections that facilitate detection of said additional display unit.

A further aspect provides a method, comprising: providing, for a primary display unit, at least one mounting mechanism, the at least one mounting mechanism being operatively coupled to at least one side of said primary display and allowing the mounting of at least one additional display unit; the mounting mechanism including electrical connections that facilitate detection of said at least one additional display unit.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-B) illustrates an example of the primary display unit with an example mounting mechanism.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Using multiple display units in a work space can be problematic. For example, having multiple displays requires having multiple display unit bases. Therefore, the footprint required at the workstation is quite large. Additionally, each monitor requires a separate power and video cable which results in a large amount of cable clutter at the workstation.

Accordingly, an example embodiment provides a device that allows a user to mount an additional display unit (or more) on the primary display unit. For example, if the user wants a dual display unit system, the user would mount an additional monitor on either side of the primary monitor using the mounting mechanisms on the monitors, without the addition of another display unit base for the additional display unit. Alternatively, the user could have a triple display unit system by mounting two additional display units, one on either side of the primary display unit.

The display units have electrical connections, which may include a single electronic connection point or many electronic connection points, which allow the primary display unit to detect the addition of any additional display units. The user is then able to configure their computer desktop to display on all the installed display units.

The illustrated example embodiments will be best understood by reference to the figures. The following description is intended only by way of example, and simply illustrates certain example embodiments.

Figure 1:
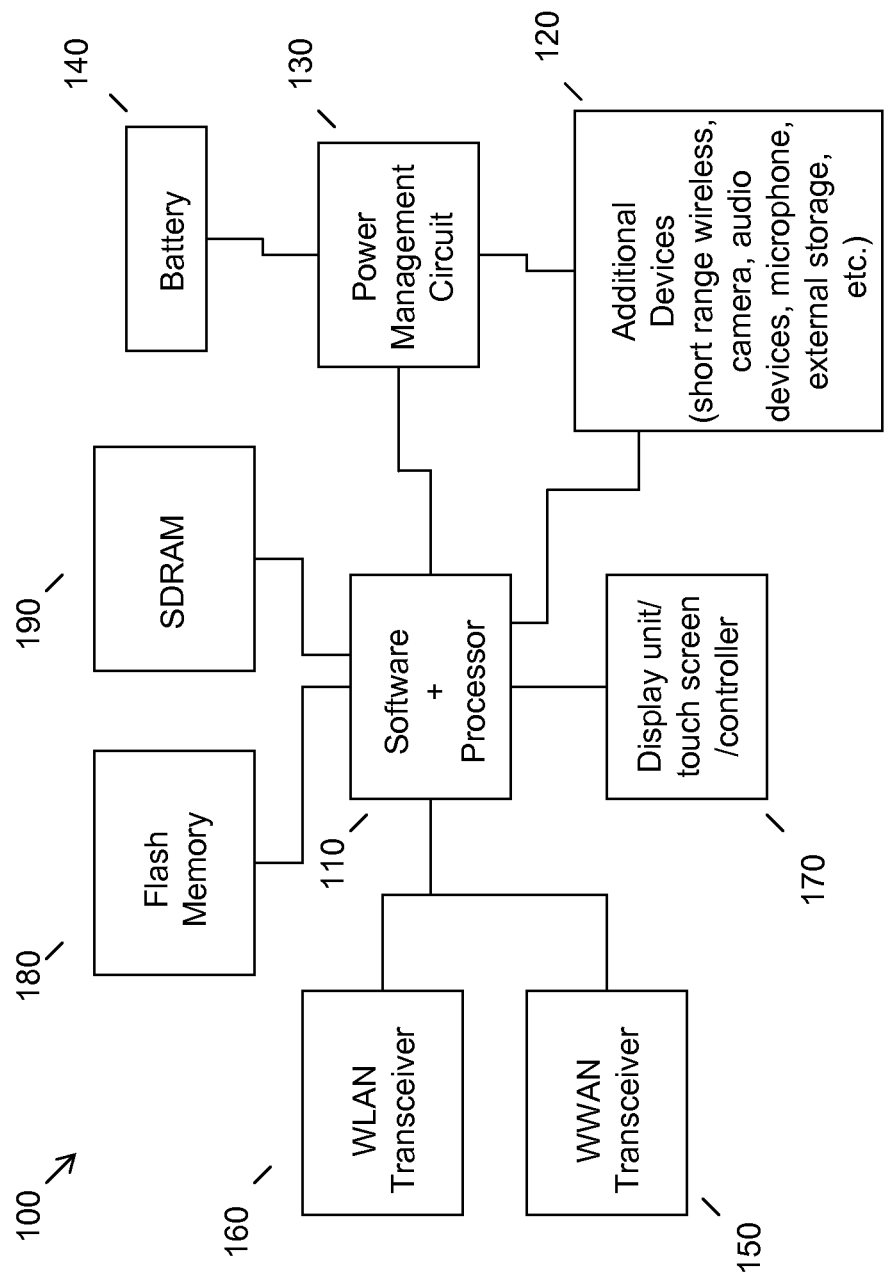
FIG. 1 illustrates an example of information handling device circuitry.

While various other circuits, circuitry or components may be utilized in information handling devices (also referred to herein as apparatuses, electronic devices, or simply devices), with regard to low power circuitry 100, an example illustrated in FIG. 1 includes a system on a circuit design found for example in smaller devices such as a tablet or other mobile computing platforms. Software and processor(s) are combined in a single circuit 110. Processors comprise internal arithmetic units, registers, cache memory, busses, I/O ports, etc., as is well known in the art. Internal busses and the like depend on different vendors, but essentially all the peripheral devices (120) may attach to a single circuit 110. The circuitry 100 combines the logic or a processor, memory control, and I/O controller hub all into a single circuit 110.

There may be separate power management chip(s) 130, e.g., a battery management circuit, which manage power as supplied, for example, via a rechargeable battery 140, which in turn may be recharged by a connection to a power source.

System 100 may include one or more of a WWAN transceiver 150 and a WLAN transceiver 160 for connecting to various networks, such as telecommunications networks and wireless Internet devices, e.g., access points. Additional devices 120 are commonly included. System 100 includes a display unit 170 for display/rendering. The display unit 170 may have touch screen capabilities for data input and display/rendering. System 100 may also include a memory device, e.g., flash memory 180 and/or SDRAM 190.

Figure 2:
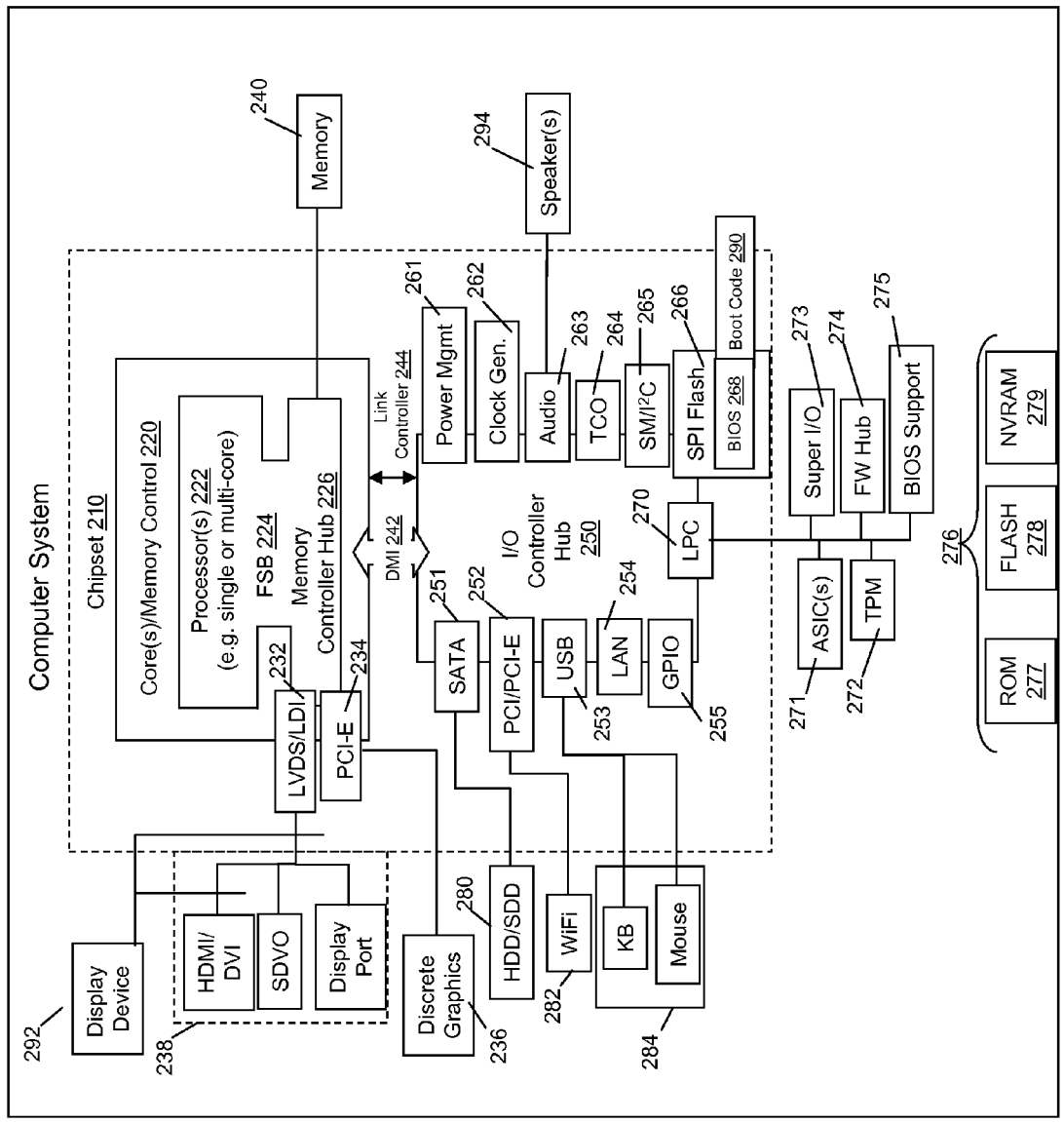
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Circuitry, as for example outlined in FIG. 1 or FIG. 2, may be used in computing devices that provide video input to the multiple display units. Alternatively or additionally, circuitry such as outlined in FIG. 1 and/or FIG. 2 may be included in a display unit itself.

Referring to FIG. 3A, in an embodiment the primary display unit 301 is attached to a display unit base 302. The display unit base 302 may hold the display unit stationary, or it may allow for the display unit to be pivoted. The display unit base 302 is designed so that with the addition of a single additional display unit, the display units will not tip or fall over. The primary display unit 301 may have mounting mechanisms 303 on either or both the left and right sides of the display unit. The mounting mechanisms 303 have electrical connections 305 to allow for an electrical connection between the primary and additional display units. Attached to the primary display unit 301 are video display and power cables 304, e.g., from an electronic device including circuitry such as that outlined in FIG. 1 and/or FIG. 2.

The electrical connections 305 provide an electrical connection between the primary and additional display units. This allows the primary display unit to detect the addition of an additional display unit. For example, on detection of an additional display connected via the electrical connections 305, an embodiment may automate or partially automate desktop expansion to include the newly detected display. This may include launching a utility for extending the desktop to include the added display responsive to a signal from the connection plate 305 detecting the added display (s).

The electrical connections 305, may be a single electronic connection point, or may have multiple electronic connection points. As an example, the electrical connections 305, are shown inside the U-shaped bracket in FIG. 3B, but it should be understood by one skilled in the art, that it may be in a different location. For example, the electrical connections 305 may be in the space outside the bracket or even on the outside of the bracket.

The electrical connections 305 may provide additional functionality than just the detection of the addition of an additional display unit. For example, in an embodiment, the electrical connections 305 may provide a power connection to the additional display unit, eliminating the need for any additional power cables to the additional display unit. In another embodiment the electrical connections 305, provides a video connection to the additional display unit, eliminating the need for any additional video display cables to the additional display units. The electrical connections 305 may provide either or both of these functionalities in addition to the display unit detection functionality. In addition the electrical connections 305 may provide a bypass from the processor to the additional display unit. For example, in one embodiment, the data may be transmitted from the processor to the additional display unit without any processing from the primary display unit.

The video display cable 304 provides a conduit to send and receive video data to/from a processor, e.g., included in one of the display units, e.g., 303 and/or in a base device, e.g., connected computing device. In an embodiment, the video display cable 304 is a cable which allows video input to more than one display unit. Therefore, the additional display units would not need a separate video display cable. However, the additional display units may have their own power and/or video display cables.

The mounting mechanism may be a U-shape, as shown in FIG. 3B. The additional display units would be mounted in this mounting mechanism by inserting a tabbed side of the additional display unit into the U-shaped bracket of the primary display unit 301 and sliding the additional display unit down until it is fully seated.

The mounting mechanisms 303 may be provided in different configurations than the one shown in FIG. 3B. For example, the mounting mechanism may be a C-shaped mechanism. The additional display units would be mounted in this mounting mechanism by inserting a tabbed side of the additional display unit into the C-shaped bracket of the primary display unit 301 and sliding the additional display unit from the front to the back of the primary display unit 301. A further alternative mounting mechanism may be a series of tabs and holes. The additional display unit would be mounted by inserting tabs into the holes of the primary display 301 unit and snapping the additional display unit into place. These configurations may be reversed (i.e. the primary monitor 301 having tabbed mounting mechanism and the additional monitor has the U-shaped slotted bracket), and that additional mounting mechanisms are possible.

In an additional embodiment, the mounting mechanisms 303 may also include a pivot. This pivot may be provided in a configuration that allows the primary 301 and additional display units to pivot. This allows the primary 301 and additional display units to be at an angle to each other when fully mounted.

In an additional embodiment, an adapter is provided to mount primary 301 and additional display units that have the same mounting mechanism. As an example, if both the primary and additional display units both have U-shaped slotted brackets, an adapter can be used to mount the two display units together. In this example, the mounting adapter may be tabbed on both sides to fit into both the primary 301 and the additional display units. The adapter would also have electrical connections on both sides and electrical connections within to make the necessary electrical connections.

Accordingly, an embodiment provides a mounting mechanism that permits additional display unit(s) to be added or coupled to a primary display unit, e.g., display unit 301 having cabling or other connection to a system. In an embodiment, this mounting mechanism includes a contact mechanism, e.g., allowing the primary display (or coupled system) to automatically detect the coupling or attachment of an additional display. Furthermore, the mounting mechanism includes electrical communication or coupling between the primary display and the additional display(s) such that power and data may be transmitted there-between. Thus, the additional display simply needs to be connected using the mounting mechanism, without the need for additional cabling, and the electronic contact detection mechanism facilitates easy addition of more than one display to provide a multi-display system.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, comprising:
a primary display unit having a U-shaped bracket on a right lateral side thereof and comprising electrical connections; and
a secondary display unit comprising a tabbed mounting mechanism on a left lateral side thereof and comprising electrical connections;
wherein the U-shaped bracket of the primary display unit receives the secondary display unit by sliding the left lateral side of the secondary display unit down until the tabbed mounting mechanism of the secondary display unit is fully seated within the U-shaped bracket; and
wherein the electrical connections of the tabbed mounting mechanism and the U-shaped bracket are arranged such that after the secondary display unit is fully seated in U-shaped bracket of the primary display unit, electrical connections between the primary display unit and the secondary display unit are made.

2. The device of claim 1, wherein the electrical connections made after joining the primary display unit and the secondary display unit provide data communication between said primary display unit and said secondary display unit.

3. The device of claim 1, wherein the electrical connections made after joining the primary display unit and the secondary display unit provide power transmission between said primary display unit and said secondary display unit.

4. The device of claim 1, wherein the primary display unit further comprises a data connection that receives and transmits data from and to a processor.

5. The device of claim 4, wherein the data connection supplies data to the secondary display unit.

6. The device of claim 5, wherein the data bypasses the primary display unit and flows to the secondary display unit and the processor.

7. The device of claim 1, further comprising at least one additional display unit operatively coupled to said primary display unit.

8. The device of claim 7, further comprising at least one mounting adapter to couple displays with like mounting mechanisms and at least one additional display unit operatively coupled to said primary display unit by way of said mounting adapter and said like mounting mechanisms.

9. The device of claim 1, wherein the electrical connections made after joining the primary display unit and the secondary display unit facilitate display of data on the secondary display.

10. A system, comprising:
a computing device;
a primary display unit operatively connected to the computing device, the primary display unit comprising a U-shaped bracket on a right lateral side thereof having electrical connections;
a secondary display unit comprising a tabbed mounting mechanism on a left lateral side thereof and comprising electrical connections;
wherein the U-shaped bracket of the primary display unit receives the secondary display unit by sliding the left lateral side of the secondary display unit down until the tabbed mounting mechanism of the secondary display unit is fully seated within the U-shaped bracket; and
wherein the electrical connections of the tabbed mounting mechanism and the U-shaped bracket are arranged such that after the secondary display unit is fully seated in U-shaped bracket of the primary display unit, electrical connections between the primary display unit and the secondary display unit are made.

11. The system of claim 10, wherein the electrical connections made after joining the primary display unit and the secondary display unit provide data communication between said primary display unit and said secondary display unit.

12. The system of claim 10, wherein the electrical connections made after joining the primary display unit and the secondary display unit provide power transmission between said primary display unit and said secondary display unit.

13. The system of claim 10, wherein the primary display unit further comprises a data connection that receives and transmits data from and to a processor of the computing device.

14. The system of claim 13, wherein the data connection supplies data to the secondary display unit.

15. The system of claim 14, wherein the data bypasses the primary display unit and flows to the secondary display unit and the processor.

16. The device of claim 10, further comprising at least one additional display unit operatively coupled to said primary display unit.

17. The system of claim 16, further comprising at least one mounting adapter to couple displays with like mounting mechanisms and at least one additional display unit operatively coupled to said primary display unit by way of said mounting adapter and said like mounting mechanisms.

18. A method, comprising:
providing a primary display unit having a U-shaped mounting mechanism on a right lateral side thereof and comprising electrical connections;
providing a secondary display unit comprising a tabbed mounting mechanism on a left lateral side thereof and comprising electrical connections;
wherein the U-shaped bracket of the primary display unit receives the secondary display unit by sliding the left lateral side of the secondary display unit down until the tabbed mounting mechanism of the secondary display unit is fully seated within the U-shaped bracket; and
wherein the electrical connections of the tabbed mounting mechanism and the U-shaped bracket are arranged such that after the secondary display unit is fully seated in U-shaped bracket of the primary display unit, electrical connections between the primary display unit and the secondary display unit are made.

19. The device of claim 1, wherein the right lateral side of the primary display unit is on the right side of a display panel of the primary display unit.

20. The device of claim 1, wherein the left lateral side of the secondary display unit is on the left side of a display panel of the secondary display unit.

* * * * *